Patented July 7, 1953

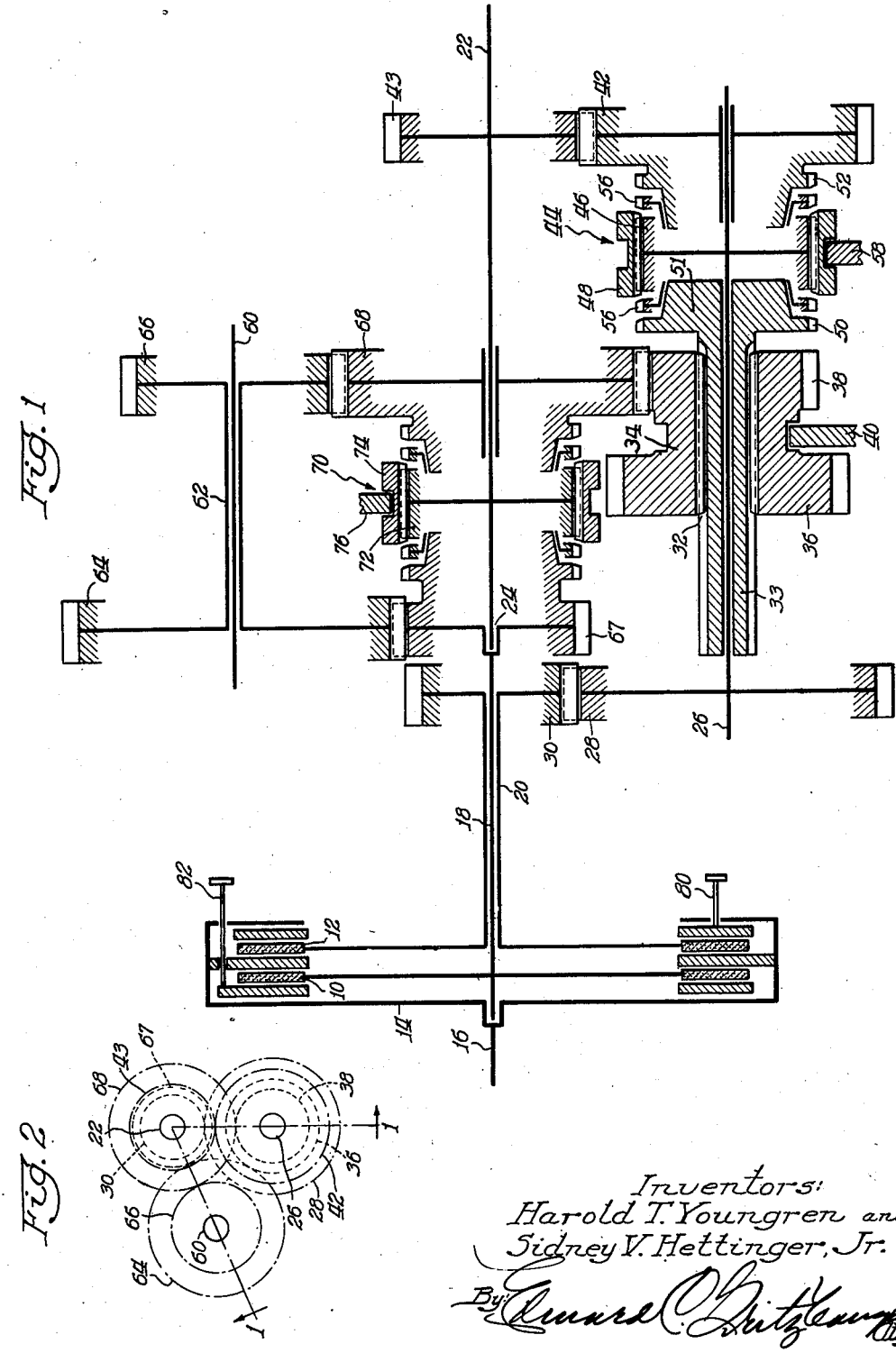

2,644,340

UNITED STATES PATENT OFFICE 2,644,340

DOUBLE COUNTERSHAFT TRANSMISSION

Harold T. Youngren, Birmingham, Mich., and Sidney V. Hettinger, Jr., Westchester, Ill., assignors to Borg-Warner Corporation, Chicago, Ill., a corporation of Illinois Application June 11, 1949, Serial No. 98,591

4 Claims. (Cl. 74—330)

The present invention relates to transmissions designed for use in connection with automotive vehicles and more particularly to a type of transmission in which the changes in gear ratio are provided by mechanisms having individual clutches which are selectively operable to produce the various gear ratios.

Reference is hereby made to, and cognizance should be taken of, our copending applications for patents, Serial Nos. 98,592, and 98,593, both filed June 11, 1949, which disclose subject matter similar to that disclosed herein.

It is among the principal objects of the invention to provide a means for operating a transmission in which an uninterrupted flow of power from the engine is applied through the transmission during speed changes, thus giving faster and smoother pick-up as well as requiring less time to get the vehicle up to the desired speed.

Conversely, it is an object of the invention to provide a transmission which operates during deceleration of the vehicle through the various gear ratios to likewise maintain a continuous operative driving connection between the vehicle engine and the propelling means for the vehicle, thus rendering such deceleration more uniform while at the same time preventing the vehicle from getting out of engine control.

A further object of the invention is to provide a transmission particularly adapted for use in automotive vehicles in which the various gear ratios between the engine and the rear or drive axle are controlled by individual clutches which cause the engine power to be diverted through the proper gears to obtain the desired ratios.

In carrying out the above-mentioned objects, the invention contemplates the provision of two separate and independent clutches. These two clutches are sufficient to provide automatic operation for four forward speeds by the provision of automatically operable shifting devices which change the gear ratio of the gear train connected to either clutch while the other clutch is in operation. This automatic gear shifting mechanism preferably includes so-called synchronizing mechanism which brings one rotating member up to the rotative speed of another before effecting a connection between them, thus completing the connection without objectional clashing of gears. The automatic means for operating such synchronizing mechanism as well as the automatic means for operating the two clutches form no part in the present invention and as a consequence, no disclosure thereof, except insofar as it is necessary to understand the present invention, has been made, the invention residing rather in the novel construction, combination, and arrangement of the transmission gearing and its association with the clutch mechanism, all of which will be more fully described and claimed hereinafter.

The provision of a transmission of the character briefly outlined above being one of the principal objects of the present invention, more specifically it is a further object of the invention to provide a compact transmission unit adapted for automatic operation in which a pair of clutches are engaged alternately to establish driving connections through a plurality of gear trains to effect four different speed ratios and also to provide a means which will permit automatic alteration of the gear ratio by selectively conditioning certain of the gear trains while another one is in operation.

A still further object of the invention is to provide a transmission of this character in which alternate operation of the two clutches provided is preceded by automatic preconditioning of certain selecting devices without interruption of the power flow from the engine through the transmission preparatory to effecting a shift in gear ratio from a low ratio to a higher one or vice versa.

Other objects and advantages of the invention not at this time enumerated become more readily apparent as the nature of the invention is better understood.

In the accompanying single sheet of drawing forming a part of this specification, one embodiment of the invention has been shown. In this drawing:

Fig. 1 is a schematic view which is representative of an actual vertical sectional view taken substantially centrally through an assembled transmission unit having three sets of parallel shafting and in which the axial centers of each set have been extended from their actual positions and moved into alignment. This view is a sectional view taken substantially along the line 1—1 of Fig. 2.

Fig. 2 is a schematic end view of the transmission.

In both of the above-described views, similar characters of reference have been employed to designate similar parts throughout.

The transmission shown schematically in Fig. 1, wherein five different trains of gears accommodate four forward speed ratios and one reverse speed ratio, requires two clutches, namely, a forward clutch 10 and a rear clutch 12. The clutches 10 and 12 are associated with a flywheel assembly 14 operatively connected to the engine drive shaft 16. The clutches 10 and 12 are capable of being selectively actuated by suitable control mechanism (not shown) either to connect the engine driven flywheel 14 to a main shaft 18 or to a sleeve shaft 20 rotatably mounted on the main shaft 18.

The driven shaft 22 which is adapted to be operatively connected to the drive wheels of the vehicle with which the transmission is associated is piloted as at 24 within the rear end of the main shaft 18.

A countershaft 26 is provided below the main shaft 18 and has mounted thereon a gear 28 which is in constant mesh with a gear 30 formed on the sleeve shaft 20. Also mounted on the countershaft 20 and rotatable thereon is a sleeve 33 which has splined thereto as at 32 a gear unit or cluster 34 including a large gear 36 and a small gear 38. The gear unit or cluster 34 is constrained to rotate with the sleeve 33 but is free to slide lengthwise thereof under the control of a shifting fork 40. A gear 42 is also mounted on the countershaft 26 and is free to rotate thereon.

A speed-shift conditioning and synchronizing device designated in its entirety at 44 includes a hub 46 mounted on the countershaft 26 and this hub has mounted thereon a sliding collar 48 designed for selective engagement with a series of teeth 50 provided on a hub 51 formed on the sleeve 33 or with a series of similar teeth 52 provided on the hub of the gear 42 in order to selectively connect either the gear cluster 34 or the gear 42 to the countershaft 36. A pair of floating rotative blocking members 56 have conical shaped surfaces which frictionally engage mating conical surfaces on the hub of the gear 42 or on the hub of the gear cluster 34 and prevent final shifting of the collar 48 until synchronization is effected. The synchronizing device 44 is of a conventional design and no claim is made herein to any novelty associated therewith, its function being to gradually bring the various rotating parts which are to be selectively connected together up to the same speed of rotation prior to effecting a final shift of the collar 48. A shift fork or yoke 58 is provided for the purpose of effecting movement of the shift collar 48.

A second countershaft 60 is provided below the main shaft 18 and has rotatably mounted thereon a gear unit or cluster 62 including a large gear 64 and a small gear 66. The gear 64 is in constant mesh with a gear 67 provided on the main shaft 18 and the gear 66 is in constant mesh with a gear 68 rotatably mounted on the driven shaft 22. A speed-shift conditioning and synchronizing device is designated in its entirety at 70. This synchronizing device is substantially identical with the speed-shift and conditioning device 44 and has a hub 72 mounted on the driven shaft 22 and the sliding collar 74 thereof serves to selectively connect either the gear 68 or the gear 67 to the drive shaft 22. A shift fork or yoke 76 controls the movement of the shift collar 74.

In the operation of the transmission as described, low or first gear is obtained by engaging the clutch 12 under the control of a suitable operating rod or other clutch actuating mechanism 80. Such operating of the clutch 12 serves to connect the sleeve shaft 20 to the flywheel 14 and cause rotation of the gear 30 mounted on the sleeve shaft 20. The speed-shift conditioning and synchronizing device 70 has its shift collar 74 shifted to the right as viewed in Fig. 1 so as to connect the gear 68 to the driven shaft 22, while the speed-shift conditioning device 44 has its shift collar shifted to the left as viewed in Fig. 1 so as to connect the sleeve 33, and consequently the gear cluster 34 to the countershaft 26. The speed-shift conditioning devices 70 and 44 may be actuated manually prior to engagement of the clutch 12 for shifting the transmission into first or low speed, but in general it is contemplated that such preconditioning of these devices shall take place automatically under the control of one or more factors associated with the operation of the vehicle. Such preconditioning of the devices 70 and 44 may be influenced by any one or a combination of such factors as engine speed, the speed of the vehicle, the position of the vehicle accelerator pedal, the degree of vacuum in the intake manifold of the vehicle engine, the viscosity of the oil in the transmission housing or any combination of these phenomena. The present invention is not concerned with the specific means by which the devices 70 and 44 are preconditioned preparatory to effecting a shift in speed ratio and it is deemed sufficient to state that, prior to any particular change in speed ratio, the desired preconditioning of the devices 70 and 44 will automatically have been effected.

With the clutch 12 engaged and the gear 68 operatively connected to the driven shaft 22 and the gear cluster 34 operatively connected to the countershaft 26 through the shift collar 48 which is moved to its forward position, a drive exists from the flywheel 14 through the clutch 12, sleeve shaft 20, gears 30 and 28, countershaft 26, hub 46, shift collar 48, sleeve 33, gears 38 and 68, shift collar 74, and hub 72 to the driven shaft 22.

The shift from first or low gear into second gear is attained merely by engagement of the clutch 10 and disengagement of the clutch 12 with the speed ratio conditioning devices 70 and 44 remaining undisturbed and in the position which they assumed in low speed gear. With the clutch 10 engaged under the influence of a suitable control mechanism 82 which may be manual or automatic, as desired, a drive exists from the flywheel 14 through the clutch 10, main shaft 18, gears 67 and 64, gears 66 and 68, shift collar 74, and hub 72 to the driven shaft 22.

Prior to shifting from second speed gear ratio into third speed gear ratio, and while an actual drive exists through the second speed gear ratio train, the shift collar 48 of the speed ratio conditioning device 44 is shifted to the right, as viewed in Fig. 1, while the speed ratio conditioning device 70 remains substantially the same with the shift collar 74 in its right-hand position. As stated above, shifting of the collar 48 of the speed ratio conditioning device 44 may take place automatically due to any one or a combination of numerous factors associated with the operation of the vehicle, as outlined above. The clutch 10 is disengaged and the clutch 12 is re-engaged so that a drive exists from a flywheel 14 through the clutch 12, sleeve shaft 20, gears 30 and 28, countershaft 26, hub 46, shift collar 48 and gears 42 and 43 to the driven shaft 22.

A direct drive condition of the transmission which is the fourth forward gear ratio thereof is attained by a shifting movement of the shift collar 74 to the left as viewed in Fig. 1, while an actual drive exists through the third speed gear ratio train so that the gear 67 and consequently the main shaft 18 will become directly connected to the driven shaft 22. The forward clutch 10 is then re-engaged and the rear clutch 12 is disengaged and a drive then exists from the flywheel 14 through the clutch 10, main shaft 18, gears 67 and 64, shift collar 74 and hub 72 to the driven shaft 22. It is obvious that when this train of gears just described is in effect, a direct drive exists from the engine shaft 16 to the driven shaft 22 and a one-to-one gear ratio of the transmission obtained.

If a down shift from third gear to second gear is in order, shifting of the shift collar 74 to the right is effected while an actual drive exists through the third speed gear train. Subsequent re-engagement of the clutch 10 and disengagement of the clutch 12 reestablishes the previously described second speed gear ratio.

Reverse drive is attained by a manual shifting of the gear cluster 34 to the left as viewed in Fig. 1 so that the gear 36 is brought into mesh with the gear 64 on the countershaft 60 (see Fig. 2). The rear clutch 12 is then engaged and the forward clutch 10 disengaged to effect a drive from the flywheel 14 through the clutch 12, shaft 20, gears 30 and 28, countershaft 26, hub 46, shift collar 48, gear 51, sleeve 33, gears 36 and 64, gears 66 and 68, shift collar 74 and hub 72 to the shaft 22 which is rotated in a reverse direction.

From the above description of the operation of transmission, it will be seen that all of the gear shift operations during acceleration of the vehicle from a standstill to direct drive gear ratio are obtained by alternate engagement and disengagement of the two clutches 10 and 12. It will be understood that the preconditioning of the synchronizing devices 70 and 44 will take place automatically under the control of operating conditions associated with the vehicle as previously outlined above. Thus, each change in speed ratio during acceleration of the vehicle is conducted by a power shift operation, which is to say that an uninterrupted flow of power during acceleration of the vehicle throughout the various speed ratio changes is maintained. As a consequence, there is practically no loss of time from the operation of changing gear ratios as is at present consumed in the standard type of construction and, since the synchronizing devices 70 and 44 are employed, clashing of gears is substantially eliminated. The net effect of the use of a transmission such as has been described in detail above is to provide a substantially effortless means whereby the vehicle may be brought up to a desired speed in less time than is ordinarily consumed with transmissions of conventional design. It will, of course, be appreciated that the same conditions of alternate engagement and disengagement of the two clutches 10 and 12 obtain during down-shifting operations with preconditioning of the synchronizing devices 70 and 44 taking place automatically.

While I have described my invention in connection with one specific embodiment thereof, it is to be understood that this is by way of illustration and not by way of limitation and the scope of my invention is defined solely by the appended claims which should be construed as broadly as the prior art will permit.

We claim:

1. In a variable speed transmission, the combination of a driving shaft, a driven shaft, and means providing first, second, third, fourth and fifth power trains capable of respectively effecting low, intermediate and high speed reduced drive ratios, a direct drive and a reverse drive between said shafts, said first power train including friction engaging means and positive engaging means for rendering said first power train effective when both engaging means are engaged to complete the low speed reduced drive between the shafts, said second power train including second friction engaging means and second positive engaging means for rendering said second power train effective when both of said second engaging means are engaged to complete the intermediate speed reduced drive between the shafts, said third power train including a third positive engaging means and also including said first friction engaging means to complete the high speed reduced drive between the shafts, said fourth power train including a fourth positive engaging means and also including said second friction engaging means to complete the direct drive between the shafts, said fifth power train including said first and second positive engaging means, said first friction engaging means and a fifth positive engaging means to complete the reverse drive between the shafts, said first and third positive engaging means being shiftable to disestablish the first power train and to establish the third power train for subsequent completion by engagement of said first friction engaging means when said second mentioned power train is effective, and said second and fourth positive engaging means being shiftable to disestablish the second power train and establish the fourth power train for subsequent completion by engagement of said second friction engaging means when said third mentioned power train is effective.

2. In a variable speed transmission, the combination of a driving shaft, a driven shaft, means providing a low speed reduced drive power train between said shafts and including a gear member movable to a first engaged position, a positive clutch and a friction clutch for completing the power train, means providing an intermediate speed reduced drive power train between said shafts and including a second positive clutch and a second friction clutch, means providing a high speed reduced drive power train between said shafts and including said first friction clutch and a third positive clutch, means providing a direct drive power train between said shafts and including said second friction clutch and a fourth positive clutch, and means for providing a reverse drive power train between said shafts and including said gear member when moved to a second engaged position, said first friction clutch and said first and second positive clutches, said first and third positive clutches having a common shiftable collar movable to a first position to engage the first positive clutch and disengage the third positive clutch and movable to a second position to engage the third positive clutch and disengage the first positive clutch, said second and fourth positive clutches having a common shiftable collar movable to a first position to engage the second positive clutch and disengage the fourth positive clutch and movable to a second position to disengage the second positive clutch and engage the fourth positive clutch, said first and second friction clutches being respectively engageable and disengageable and said first positive clutch being engageable to establish the first speed power train, said first and second friction clutches being respectively disengageable and engageable and said second positive clutch being engageable to establish the second speed power train, said first and second friction clutches being respectively engageable and disengageable and said third positive clutch being engageable to establish the third speed power train, said first and second friction clutches being respectively disengageable and engageable and said fourth positive clutch being engageable to establish said fourth speed power train, the common shiftable collar for the first and third positive clutches being shiftable to disengage the first positive clutch and engage the third positive clutch and vice versa when the intermediate speed reduced drive power train is established, the common shiftable collar for the second and fourth positive clutches being shiftable to disengage the second positive clutch and engage the fourth positive clutch and vice versa when the high speed reduced drive power train is established.

3. In a variable speed transmission, the combination of a driving shaft, a driven shaft, means providing a low speed reduced drive power train between said shafts and including a slidable gear member having two sets of teeth and movable to bring a first one of said sets of teeth into an engaged position, a first positive clutch and a first friction clutch for completing the power train, means providing an intermediate speed reduced drive power train between said shafts and including a second positive clutch and a second friction clutch, means providing a high speed reduced drive power train between said shafts and including said first friction clutch and a third positive clutch, means providing a direct drive power train between said shafts and including said second friction clutch and a fourth positive clutch, and means providing a reverse drive power train between said shafts and including said slidable gear member when moved to bring its other set of teeth into an engaged position, said first and second positive clutches and said first friction clutch, said first and third positive clutches having a common shiftable collar movable to a first position to engage the first positive clutch and disengage the third positive clutch and movable to a second position to engage the third positive clutch and disengage the first positive clutch, said second and fourth positive clutches having a common shiftable collar movable to a first position to engage the second positive clutch and disengage the fourth positive clutch and movable to a second position to engage the fourth positive clutch and disengage the second positive clutch, said first and second friction clutches being respectively engageable and disengageable, said first positive clutch being engageable and said slidable gear member being moved to bring its first set of teeth into engaged position to establish the low speed reduced drive power train, said first and second friction clutches being respectively disengageable and engageable and said second positive clutch being engageable to establish the intermediate speed reduced drive power train, said first and second friction clutches being respectively engageable and disengageable and said third positive clutch being engageable to establish the high speed reduced drive power train, said first and second friction clutches being disengageable and engageable and said fourth positive clutch being engageable to establish said direct drive power train, said first and second friction clutches being respectively engageable and disengageable, said first and second positive clutches being engageable and said slidable gear member being moved into a position to bring its other set of teeth into an engaged position to establish said reverse drive power train, the common shiftable collar for the first and third positive clutches being shiftable to disengage the first positive clutch and engage the third positive clutch and vice versa when the intermediate speed reduced drive power train is established, the common shiftable collar for the second and fourth positive clutches being shiftable to disengage the second positive clutch and engage the fourth positive clutch and vice versa when the high speed reduced drive power train is established.

4. In a variable speed transmission, the combination of a driving shaft, a driven shaft, means providing a low speed reduced drive power train between said shafts and including a positive clutch and a friction clutch for completing the power train, means providing an intermediate speed reduced drive power train between said shafts and including a second positive clutch and a second friction clutch, means providing a high speed reduced drive power train between said shafts and including said first friction clutch and a third positive clutch, means providing a direct drive power train between said shafts and including said second friction clutch and a fourth positive clutch, and means for providing a reverse drive power train between said shafts and including said first friction clutch, said first and second positive clutches and positive engaging means, said first and second friction clutches being respectively engageable and disengageable and said first positive clutch being engageable to establish the low speed reduced drive power train, said first and second friction clutches being respectively disengageable and engageable and said second positive clutch being engageable to establish the intermediate speed reduced drive power train, said first and second friction clutches being respectively engageable and disengageable and said third positive clutch being engageable to establish the high speed reduced drive power train, said first and second friction clutches being respectively disengageable and engageable and said fourth positive clutch being engageable to establish said direct drive power train, and said first and second friction clutches being respectively engageable and disengageable and said first and second positive clutches and said positive engaging means being engageable to establish said reverse drive power train.

HAROLD T. YOUNGREN.
SIDNEY V. HETTINGER, Jr.

References Cited in the file of this patent

UNITED STATES PATENTS

| Number | Name | Date |
|---|---|---|
| 2,010,161 | Robbins | Aug. 6, 1935 |
| 2,315,808 | Miller | Apr. 6, 1943 |
| 2,386,540 | Campodonico | Oct. 9, 1945 |
| 2,386,541 | Campodonico | Oct. 9, 1945 |
| 2,466,318 | Kohr | Apr. 5, 1949 |
| 2,485,688 | Banker | Oct. 25, 1949 |
| 2,549,738 | Winther | Apr. 17, 1951 |
| 2,567,042 | Wemp | Sept. 4, 1951 |

FOREIGN PATENTS

| Number | Country | Date |
|---|---|---|
| 119,098 | Great Britain | Sept. 26, 1918 |
| 226,366 | Switzerland | July 1, 1943 |
| 232,801 | Switzerland | Sept. 1, 1944 |
| 604,178 | Great Britain | June 29, 1948 |

OTHER REFERENCES

Ser. No. 344,826, Kegresse (A. P. C.), published May 4, 1943.